United States Patent
Kwon et al.

(10) Patent No.: US 9,461,713 B2
(45) Date of Patent: Oct. 4, 2016

(54) DATA RECEPTION APPARATUS AND METHOD, DATA TRANSMISSION APPARATUS, AND DATA COMMUNICATION SYSTEM USING MUTUAL RESONANCE

(71) Applicant: Samsung Electronics Co., Ltd., Suwon-si (KR)

(72) Inventors: Ui Kun Kwon, Hwaseong-si (KR); Sang Joon Kim, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/846,887

(22) Filed: Mar. 18, 2013

(65) Prior Publication Data
US 2014/0011449 A1    Jan. 9, 2014

(30) Foreign Application Priority Data
Jul. 3, 2012 (KR) .................. 10-2012-0072117

(51) Int. Cl.
*H04B 5/00* (2006.01)
*H02J 7/02* (2016.01)
(52) U.S. Cl.
CPC .......... *H04B 5/0037* (2013.01); *H04B 5/0081* (2013.01); *H02J 7/025* (2013.01); *H04B 5/0031* (2013.01)

(58) Field of Classification Search
None
See application file for complete search history.

(56) References Cited

U.S. PATENT DOCUMENTS

| 2010/0007307 A1* | 1/2010 | Baarman et al. ............. 320/108 |
| 2010/0323616 A1* | 12/2010 | Von Novak et al. ........ 455/41.1 |
| 2011/0068765 A1* | 3/2011 | Segoria ......................... 323/313 |
| 2012/0242161 A1* | 9/2012 | Kudo ..................... H02J 17/00 307/104 |
| 2013/0260676 A1* | 10/2013 | Singh .......................... 455/41.1 |

FOREIGN PATENT DOCUMENTS

| JP | 2011-142763 A | 7/2011 |
| KR | 10-2011-0060795 A | 6/2011 |
| KR | 10-2011-0062841 A | 6/2011 |
| KR | 10-2011-0116854 A | 10/2011 |
| KR | 10-2011-0121450 A | 11/2011 |
| KR | 10-2011-0121453 A | 11/2011 |
| KR | 10-1094595 B1 | 12/2011 |

* cited by examiner

*Primary Examiner* — Alejandro Rivero
(74) *Attorney, Agent, or Firm* — NSIP Law

(57) ABSTRACT

A data reception apparatus configured to discharge, prior to receiving data from an energy receiving apparatus, energy stored in a source resonator during a mutual resonance between the source resonator and a target resonator, and demodulate data received from the energy receiving apparatus based on an amount of energy reflected from the target resonator after the energy stored in the source resonator is discharged.

20 Claims, 11 Drawing Sheets

DATA RECEPTION APPARATUS AND METHOD, DATA TRANSMISSION APPARATUS, AND DATA COMMUNICATION SYSTEM USING MUTUAL RESONANCE

CROSS-REFERENCE TO RELATED APPLICATIONS

This application claims the benefit under 35 USC 119(a) of Korean Patent Application No. 10-2012-0072117 filed on Jul. 3, 2012, in the Korean Intellectual Property Office, the disclosure of which is incorporated herein by reference in its entirety for all purposes.

BACKGROUND

1. Field

The following description relates to an apparatus and a method for performing data communication in a system that wirelessly transmits and receives power.

2. Description of Related Art

Research on wireless power transmission has been ongoing to overcome issues such as an increasing inconvenience of wired power supplies and limits to existing battery capacities due to an increase in various electronic devices including mobile devices and other devices that are intended to operate without a wired power supply. In particular, there has been a concentration on research on near-field wireless power transmission. Near-field wireless power transmission refers to an example in which a distance between a transmission coil and a reception coil is small compared to a wavelength at an operation frequency. For example, a wireless power transmission and reception system using a resonance characteristic may include a source configured to supply power, and a target configured to receive the supplied power. When wireless power is transmitted and received, the source and the target may need to share control information.

SUMMARY

In one general aspect, a data reception apparatus includes an energy discharger configured to discharge, prior to the data reception apparatus receiving data from an energy receiving apparatus, energy stored in a source resonator during a mutual resonance between the source resonator and a target resonator; and a demodulator configured to demodulate data received from the energy receiving apparatus based on an amount of energy reflected from the target resonator after the energy stored in the source resonator is discharged.

The energy discharger may include a resistor configured to consume the energy stored in the source resonator; and a switch configured to electrically connect the resistor to the source resonator.

The energy discharger may further include a capacitor configured to change a resonant frequency of the source resonator during discharging of the energy stored in the source resonator through the resistor.

The demodulator may be further configured to determine whether the mutual resonance occurs between the source resonator and the target resonator based on the amount of the reflected energy, and demodulate the received data based on whether the mutual resonance occurs.

The data reception apparatus may further include a measurement unit configured to measure a value of a voltage applied to the source resonator; and a determination unit configured to determine whether the energy stored in the source resonator is discharged based on the value of the voltage measured by the measurement unit.

The demodulator may include a dynamic range controller configured to control a dynamic range of an analog-to-digital converter (ADC) based on a distance between the energy receiving apparatus and an energy transmitting apparatus, the ADC being configured to perform sampling of a waveform of the energy stored in the source resonator.

The demodulator may include an amplifier configured to amplify the amount of the energy reflected from the target resonator to an amount of energy great enough to be demodulated.

In another general aspect, a data transmission apparatus includes an energy receiver configured to receive energy through a mutual resonance between a target resonator and a source resonator; and a modulator configured to modulate data based on an amount of energy reflected from the target resonator after energy stored in the source resonator is discharged.

The data transmission apparatus may further include a controller configured to determine whether to enable the mutual resonance to occur between the target resonator and the source resonator, and control the amount of the energy reflected from the target resonator.

The controller may be further configured to change a resonant frequency of the target resonator.

In another general aspect, a data communication system includes a data reception apparatus configured to discharge, prior to receiving data from an energy receiving apparatus, energy stored in a source resonator during a mutual resonance between the source resonator and a target resonator, and demodulate data received from the energy receiving apparatus based on an amount of energy reflected from the target resonator after the energy stored in the source resonator is discharged; and a data transmission apparatus configured to receive energy through the mutual resonance, and modulate data based on the amount of the energy reflected from the target resonator after the energy stored in the source resonator is discharged.

The data reception apparatus may include an energy discharger configured to discharge, prior to receiving the data from the energy receiving apparatus, the energy stored in the source resonator through a resistor connected to the source resonator; and a demodulator configured to demodulate the data received from the energy receiving apparatus based on the amount of the energy reflected from the target resonator.

The data transmission apparatus may include a controller configured to determine whether to enable the mutual resonance to occur between the target resonator and the source resonator, and control the amount of the energy reflected from the target resonator; and a modulator configured to modulate data based on the amount of the energy reflected from the target resonator after the energy stored in the source resonator is discharged.

In another general aspect, a data reception method includes discharging, prior to receiving data from an energy receiving apparatus, energy stored in a source resonator during a mutual resonance between the source resonator and a target resonator; and demodulating data received from the energy receiving apparatus based on an amount of energy reflected from the target resonator after the energy stored in the source resonator is discharged.

The discharging may include electrically connecting a resistor to the source resonator using a switch; and consuming the energy stored in the source resonator using the resistor.

The discharging may further include connecting a capacitor to the source resonator to change a resonant frequency of the source resonator during discharging of the energy stored in the source resonator through the resistor.

The demodulating may include determining whether the mutual resonance occurs between the source resonator and the target resonator based on the amount of the reflected energy; and demodulating the received data based on whether the mutual resonance occurs.

Other features and aspects will be apparent from the following detailed description, the drawings, and the claims.

DETAILED DESCRIPTION

Figure 1:
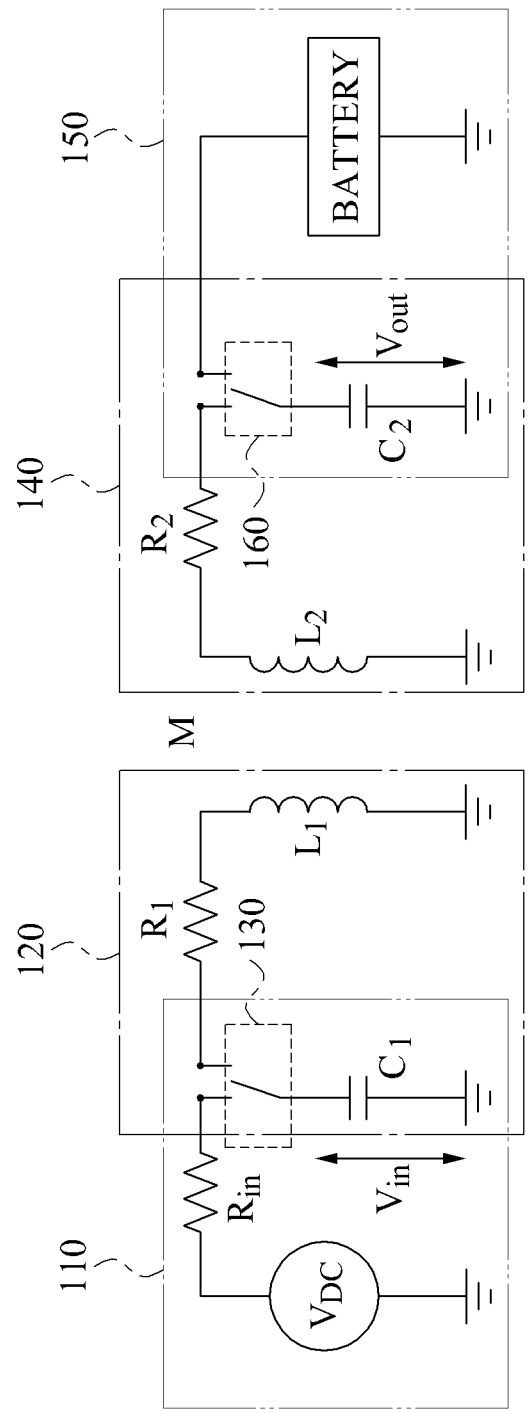
FIG. 1 is a diagram illustrating an example of an equivalent circuit of a data communication system using wireless power.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

In the following description, the expression "turning on a switch" refers to closing the switch to connect a first element to a second element, and the expressing "turning off a switch" refers to opening the switch to disconnect the first element from the second element. Thus, the switch is turned on when it is closed, and is turned off when it is open. The switch may be a mechanical switch or an electronic switch.

A wireless power transmission system may be applied to various systems requiring wireless power. The wireless power transmission system may be applied to a system enabling use of wireless power, for example a mobile phone, a wireless television (TV), and any other system enabling use of wireless power. Additionally, the wireless power transmission system may be applicable in a bio-healthcare field, and may be used to remotely transmit power to a device inserted into a human body, or used to wirelessly transmit power to a bandage-shaped device for measurement of a heart rate.

Additionally, the wireless power transmission system may be used to remotely control an information storage device without a power source. The wireless power transmission system may be applied to a system that is configured to supply power to an information storage device to remotely operate the information storage device, and to wirelessly request information stored in the information storage device.

The wireless power transmission system may receive energy supplied from a power supply unit, and may store the energy in a source resonator for using in generating a wireless power transmission signal. The wireless power transmission system may enable the source resonator to self-resonate by turning off a switch that electrically connects the power supply unit to the source resonator. For example, when a target resonator with the same resonant frequency as the source resonator is disposed within a distance close enough to resonate with the source resonator that self-resonates, a mutual resonance phenomenon may occur between the source resonator and the target resonator.

In the examples described herein, the term 'source resonator' may refer to a resonator to receive energy from a power supply unit, and the term 'target resonator' may refer to a resonator to receive energy from the source resonator due to the mutual resonance phenomenon.

FIG. 1 is a diagram illustrating an example of an equivalent circuit of a data communication system using wireless power. In the example of FIG. 1, a power input unit is physically separated from a power transmitting unit by a capacitor and a switch, and a receiving unit is physically separated from a power output unit by a capacitor and a switch. The above-described data communication system may be defined as a 'resonator isolation (RI) system.'

Referring to FIG. 1, the data communication system has a source-target structure including a source and a target. The data communication system includes a wireless power transmitting apparatus corresponding to the source, and a wireless power receiving apparatus corresponding to the target.

The wireless power transmitting apparatus includes a power input unit 110, a power transmitting unit 120, and a switch unit 130. The power input unit 110 stores energy in a capacitor $C_1$ using a power supply unit. The switch unit 130 connects the capacitor $C_1$ to the power input unit 110 while the energy is being stored in the capacitor $C_1$. Additionally, the switch unit 130 disconnects the capacitor $C_1$ from the power input unit 110 and connects the capacitor $C_1$ to the power transmitting unit 120 while the energy stored in the capacitor $C_1$ is being discharged. The switch unit 130 prevents the capacitor $C_1$ from being connected to the power input unit 110 and the power transmitting unit 120 at the same time.

The power transmitting unit 120 transfers electromagnetic energy to a receiving unit 140. In the example of FIG. 1, the power transmitting unit 120 transfers power through a mutual resonance between a source resonator of the power transmitting unit 120 and a target resonator of the receiving unit 140. The source resonator includes the capacitor $C_1$ and a transmission coil $L_1$, and the target resonator includes a capacitor $C_2$ and a reception coil $L_2$. The level of the mutual resonance between the source resonator and the target resonator is determined by a mutual inductance M between the transmission coil $L_1$ and the reception coil $L_2$.

The power input unit 110 may be modeled as an input voltage $V_{DC}$, an internal resistor $R_{in}$, and the capacitor $C_1$, and the power transmitting unit 120 may be modeled as circuit elements $R_1$, $L_1$, and $C_1$. Additionally, the switch unit 130 may be modeled as a plurality of switches. For example, the switches may include an active element enabling an on/off function. In FIG. 1, R, L, and C represent a resistance, an inductance, and a capacitance, respectively. A voltage applied to the capacitor $C_1$ from the input voltage $V_{DC}$ may be represented by $V_{in}$.

In FIG. 1, the wireless power receiving apparatus includes the receiving unit 140, a power output unit 150, and a switch unit 160. The receiving unit 140 receives electromagnetic energy from the power transmitting unit 120, and stores the received electromagnetic energy in the capacitor $C_2$. The switch unit 160 connects the capacitor $C_2$ to the receiving unit 140 while the energy is being stored in the capacitor $C_2$. The switch unit 160 disconnects the capacitor $C_2$ from the receiving unit 140 and connects the capacitor $C_2$ to the power output unit 150 while the energy in the capacitor $C_2$ is being transferred to a load, for example, a battery. The switch unit 160 prevents the capacitor $C_2$ from being connected to the receiving unit 140 and the power output unit 150 at the same time.

The reception coil $L_2$ of the receiving unit 140 receives power through mutual resonance with the transmission coil $L_1$ of the power transmitting unit 120. The received power is used to charge the capacitor $C_2$ connected to the reception coil $L_2$. The power output unit 150 transfers energy stored in the charged capacitor $C_2$ to the load, for example, the battery. In another example, the power output unit 150 transfers the energy stored in the charged capacitor $C_2$ to a load or a target device instead of the battery.

The receiving unit 140 may be modeled as basic circuit elements $R_2$, $L_2$, and $C_2$, and the power output unit 150 may be modeled as the capacitor $C_2$ and the battery. The switch unit 160 may be modeled as a plurality of switches. A voltage applied to the capacitor $C_2$ from energy received by the reception coil $L_2$ may be represented by $V_{out}$.

The RI system enables power to be transmitted in an example in which the power input unit 110 is physically separated from the power transmitting unit 120 and the receiving unit 140 is physically separated from the power output unit 150. The RI system has various advantages in comparison to a conventional power transmission method using impedance matching. For example, the RI system does not need a power amplifier because power is supplied from a direct current (DC) source directly to a source resonator. Further, the RI system does not require a rectifier because energy stored in a capacitor of a receiver is captured in order to charge a battery. Moreover, a transmission efficiency is not affected by a change in a distance between a transmitter and a receiver because there is no need to perform impedance matching. Additionally, the RI system may be easily extended to a wireless power transmission system including a plurality of transmitters and a plurality of receivers.

Figure 2:
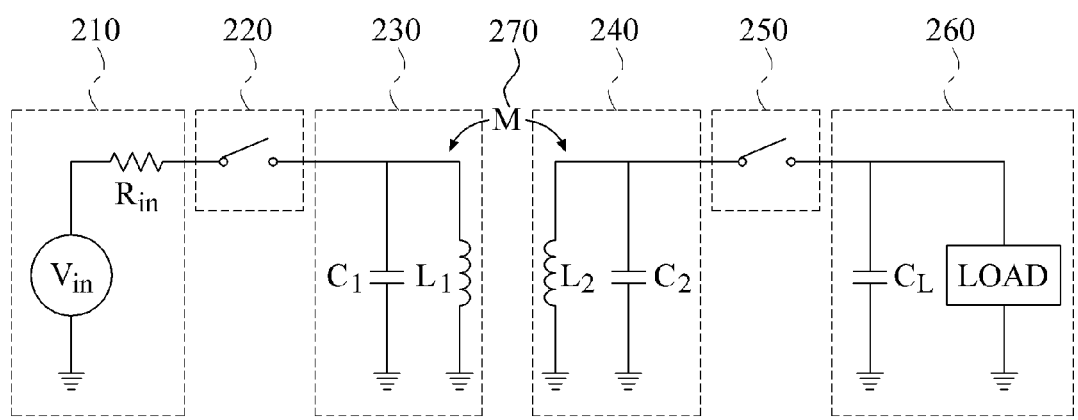
FIG. 2 is a diagram illustrating another example of an equivalent circuit of a data communication system using wireless power.

FIG. 2 is a diagram illustrating another example of an equivalent circuit of a data communication system using wireless power. In this example, a power charging unit is physically separated from a transmitting unit by a switch, and a charging unit is physically separated from a power output unit by a switch. In other words, FIG. 2 illustrates another example of an RI system.

Referring to FIG. 2, the data communication system has a source-target structure including a source and a target. The data communication system includes a wireless power transmitting apparatus corresponding to the source, and a wireless power receiving apparatus corresponding to the target.

The wireless power transmitting apparatus includes a power charging unit 210, a control unit 220, and a transmitting unit 230. In this example, the power charging unit 210 includes a power supply unit $V_{in}$ and an internal resistor $R_{in}$. In FIG. 2, a capacitor $C_1$ and an inductor $L_1$ are referred to as a source resonator. In this example, the source resonator corresponds to the transmitting unit 230. The transmitting unit 230 transmits energy stored in the source resonator to the wireless power receiving apparatus through mutual resonance between the source resonator and a target resonator. The control unit 220 turns on a switch to enable power to be supplied from the power charging unit 210 to the source resonator. Voltage is applied from the power supply unit $V_{in}$ to the capacitor $C_1$, and current is applied to the inductor $L_1$. When the source resonator reaches a steady state, the voltage applied to the capacitor $C_1$ has a value of '0', and the current flowing in the inductor $L_1$ has a value of '$V_{in}/R_{in}$.' In the steady state, the inductor $L_1$ is charged with power using the current applied to the inductor $L_1$.

When the power used to charge the source resonator in the steady state reaches a predetermined value, the control unit 220 turns off the switch. Information on the predetermined value may be set by the control unit 220. Turning off the switch separates the power charging unit 210 from the transmitting unit 230. When the switch is turned off, the source resonator starts self-resonating between the capacitor $C_1$ and the inductor $L_1$. Energy stored in the source resonator is transferred to the target resonator through a mutual inductance M 270 between the source resonator and the target resonator. A resonant frequency $f_1$ of the source resonator is the same as a resonant frequency $f_2$ of the target resonator. The resonant frequencies $f_1$ and $f_2$ may be calculated using the following equations:

$$f_1 = \frac{1}{2\pi\sqrt{L_1 C_1}}, f_2 = \frac{1}{2\pi\sqrt{L_2 C_2}}$$

The wireless power receiving apparatus includes a charging unit 240, a control unit 250, and a power output unit 260. In FIG. 2, a capacitor $C_2$ and an inductor $L_2$ are referred to as a source resonator. The target resonator corresponds to the charging unit 240. During mutual resonance between the source resonator and the target resonator, the source resonator is separated from the power supply unit $V_{in}$, and the target resonator is separated from a load and a capacitor $C_L$. The capacitor $C_2$ and the inductor $L_2$ of the charging unit 240 are charged with power through the mutual resonance.

To charge the target resonator with power, the control unit 250 turns off a switch. When the switch is turned off, the source resonator and the target resonator resonate with each other since the target resonator has the same resonant frequency as the source resonator. When the charge in the target resonator reaches a predetermined value, the control unit 250 turns on the switch. Information on the predetermined value is set by the control unit 250. By turning the switch on, the capacitor $C_L$ is connected to the charging unit 240, and the resonant frequency of the target resonator is changed. A value of the changed resonant frequency of the target resonator may be obtained using the following equation:

$$f_2' = \frac{1}{2\pi\sqrt{L_2(C_2 + C_L)}}$$

Accordingly, the resonant frequency $f_2'$ of the target resonator becomes different from the resonant frequency $f_1$ of the source resonator, which causes the mutual resonance between the source resonator and the target resonator to be terminated. For example, when $f_2'$ is much smaller than $f_2$ based on a Q-factor of the target resonator, a mutual resonance channel is removed. Additionally, the power output unit 260 transfers energy stored in the capacitor $C_2$ and the inductor $L_2$ to a load. For example, the power output unit 260 transfers the energy using a scheme suitable for the load. For example, the power output unit 260 may regulate a voltage output from the capacitor $C_2$ and the inductor $L_2$ to a rated voltage that is required by the load, and may transfer the energy to the load at the rated voltage.

When the charge in the target resonator is less than a predetermined value, the control unit 250 turns off the switch, which causes the resonant frequency $f_2$ of the target resonator to become identical to the resonant frequency $f_1$ of the source resonator, enabling the charging unit 240 to recharge the target resonator with power using the mutual resonance between the source resonator and the target resonator.

During the mutual resonance between the source resonator and the target resonator, the control units 220 and 250 turn the switches off. Accordingly, it is possible to prevent transmission efficiency from being reduced due to the switches being turned on.

A scheme of FIG. 2 for controlling a point in time of capturing energy stored in a target resonator may be performed more easily than a scheme of FIG. 1 for capturing energy stored in a capacitor. In the scheme of FIG. 1, a wireless power receiver captures the energy stored in the capacitor. However, in a scheme of FIG. 2 for changing a resonant frequency and capturing energy, energy stored in an inductor and a capacitor of a target resonator is captured. Accordingly, a degree of freedom for the point in time of capturing energy may be improved.

To transmit power or data, a transmitter in the RI system may repeatedly charge a source resonator with energy and discharge energy by turning a switch off and on. In various examples herein, a single charge and discharge of energy may be defined as a single symbol. To receive energy or data from the transmitter, a receiver in the RI system may operate a switch of the receiver based on an operation period of a switch of the transmitter that repeatedly performs charging and discharging.

To receive power or data from the transmitter without an error, the receiver may need to know when the switch of the transmitter is turned off, when the switch of the transmitter is turn on, when the mutual resonance is occurring, and when energy stored in the target resonator has a peak value.

An operation of acquiring information regarding an on/off time of the switch of the transmitter and matching an on/off time of the switch of the receiver to the acquired information may be defined as 'time synchronization.'

Figure 3:
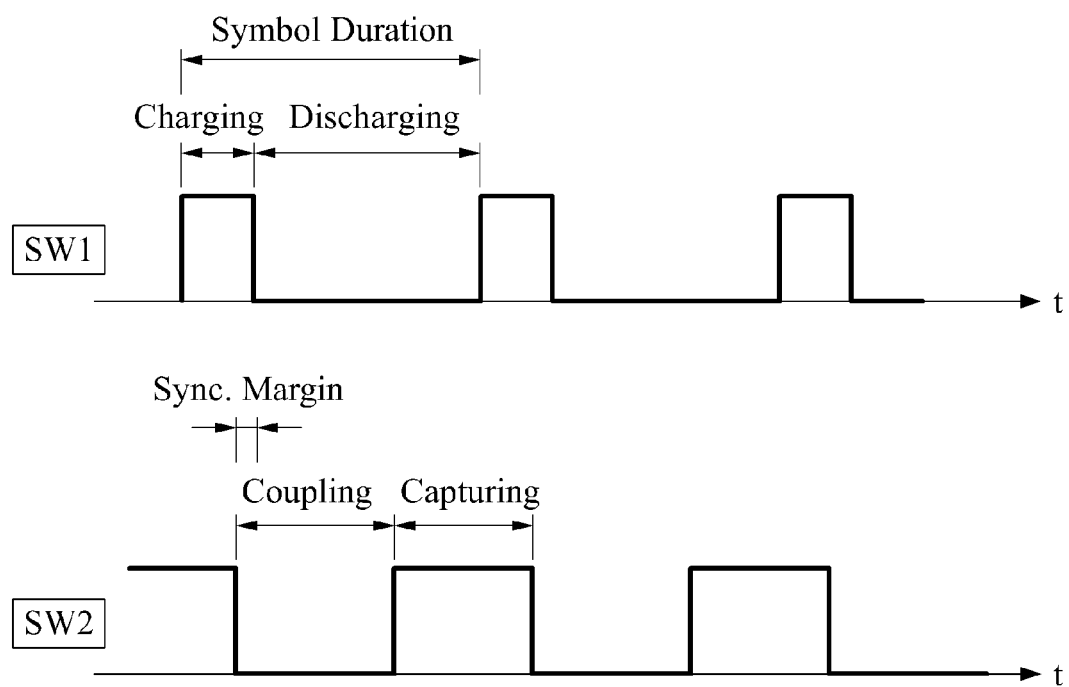
FIG. 3 is a diagram illustrating an example of an operation timing of switches in a transmitter and a receiver in a data communication system using wireless power.

FIG. 3 is a diagram illustrating an example of an operation timing of switches in a transmitter and a receiver in a data communication system using wireless power.

Referring to FIG. 3, the transmitter transmits energy to the receiver by repeating charging and discharging of energy. In various examples herein, a single charge and discharge of energy is defined as a single symbol.

To receive energy from the transmitter, the receiver turns off a switch SW2 of the receiver, and establishes mutual resonance with the transmitter during a predetermined time (namely, a synchronization (sync) margin) after the transmitter is switched from the charging to the discharging due to turning off of a switch SW1 of the transmitter.

For example, when the mutual resonance is established, a target resonator of the receiver is charged with energy. The mutual resonance is a result of coupling between a source resonator and a target resonator. The receiver turns on the switch SW2 at a point in time at which energy stored in the target resonator has a peak value to change a resonant frequency of the target resonator to be different from a resonant frequency of the source resonator and capture the energy stored in the target resonator.

Figure 4:
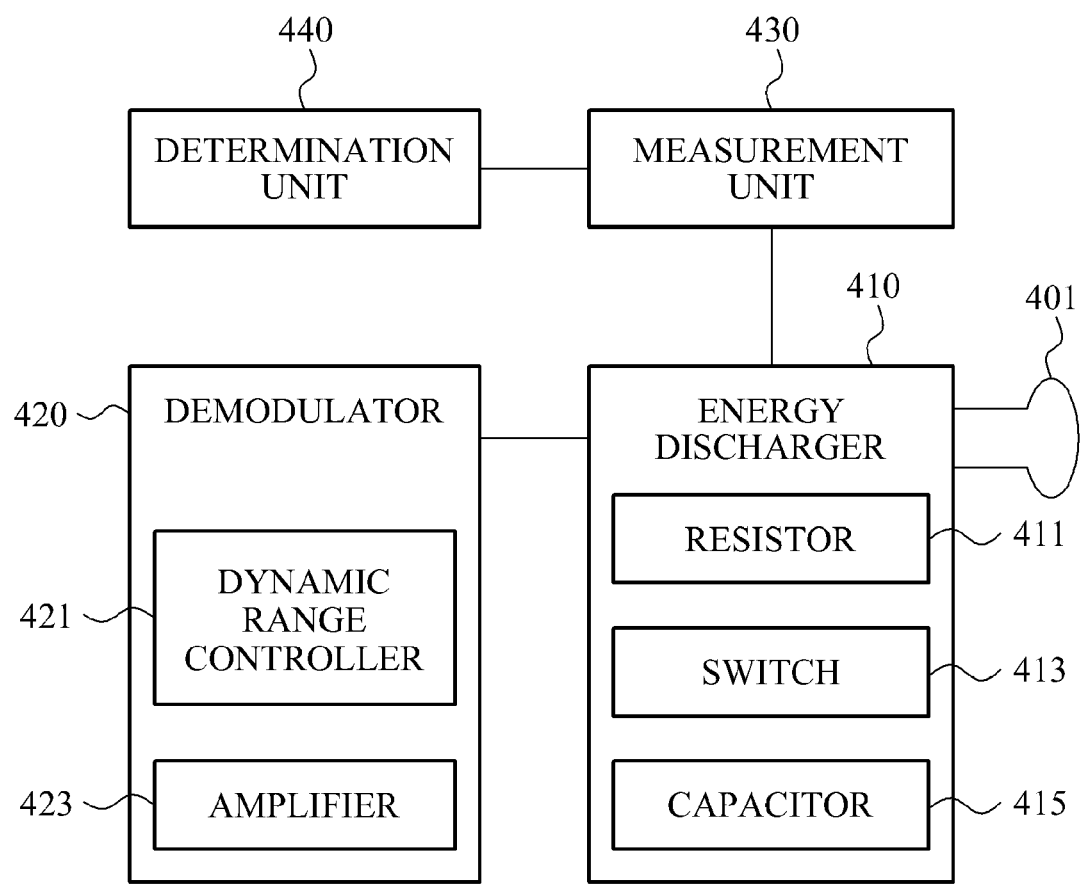
FIG. 4 is a block diagram illustrating an example of a data reception apparatus.

FIG. 4 is a block diagram illustrating an example of a data reception apparatus. Referring to FIG. 4, the data reception apparatus includes an energy discharger 410 and a demodulator 420. The data reception apparatus may further include a measurement unit 430 and a determination unit 440. although these elements may be omitted.

Figure 5:
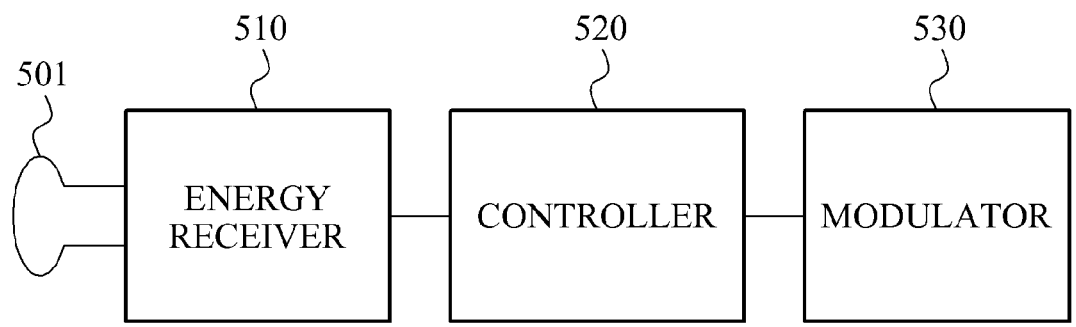
FIG. 5 is a block diagram illustrating an example of a data transmission apparatus.

The energy discharger 410 discharges energy stored in a source resonator 401 during a mutual resonance between the source resonator 401 and a target resonator (not shown in FIG. 4, but shown in FIG. 5). Before the data reception apparatus receives data from an energy receiving apparatus, the energy discharger 410 discharges the energy stored in the source resonator 401.

When a mutual resonance occurs between the source resonator 401 of an energy transmitting apparatus and the target resonator of the energy receiving apparatus, the energy stored in the source resonator 401 is transferred to the target resonator, and a part of the transferred energy is retransferred from the target resonator to the source resonator 401. When the mutual resonance does not occur, a part of the energy transferred to the target resonator is not retransferred to the source resonator 401. Retransferring of energy from the target resonator to the source resonator 401 through the mutual resonance is defined to be energy reflection.

The energy receiving apparatus changes a resonant frequency of the target resonator, determines whether the mutual resonance occurs between the source resonator 401 and the target resonator, and transmits data to the energy transmitting apparatus based on whether the mutual resonance occurs.

A path through which data is transmitted from the energy transmitting apparatus to the energy receiving apparatus may be defined to be a downlink, and a path through which data is transmitted from the energy receiving apparatus to the energy transmitting apparatus may be defined to be an uplink.

The energy discharger 410 may discharge the energy stored in the source resonator 401 at a time that is set in advance between the energy receiving apparatus and the energy discharger 410, or at a predetermined time.

As illustrated in FIG. 4, the energy discharger 410 includes a resistor 411 and a switch 413. The resistor 411 consumes the energy stored in the source resonator 401. The switch 413 electrically connects the resistor 411 to the source resonator 401. For example, the resistor 411 may consume the energy stored in the source resonator 401 by dissipating the energy as heat.

The energy discharger 410 also includes a capacitor 415 used to change a resonant frequency of the source resonator 401 during discharging of the energy stored in the source resonator 401 through the resistor 411. To prevent energy from being transferred from the target resonator to the source resonator 401 when the resistor 411 is connected to the source resonator 401, the resonant frequency of the source resonator 401 needs to be changed. The capacitor 415 is connected to the source resonator 401 during the discharging of the energy stored in the source resonator 401 through the resistor 411, which changes the resonant frequency of the source resonator, thereby terminating the mutual resonance between the source resonator 401 and the target resonator.

The demodulator 420 may demodulate data received from the energy receiving apparatus based on an amount of energy reflected from the target resonator after the energy stored in the source resonator 401 is discharged. In one example, when the energy stored in the source resonator 401 is equal to or less than a predetermined value, the demodulator 420 demodulates data based on the amount of the energy reflected from the target resonator. In another example, when the energy stored in the source resonator 401 is discharged, the demodulator 420 demodulates the data received from the energy receiving apparatus based on a waveform of the energy reflected from the target resonator.

In one example, when the energy stored in the source resonator 401 is discharged, the capacitor 415 is disconnected from the source resonator 401. In another example, when the energy stored in the source resonator 401 is equal to or less than a predetermined value, the capacitor 415 is disconnected from the source resonator 401.

The demodulator 420 determines whether the mutual resonance occurs between the target resonator and the source resonator 401 based on the amount of the energy reflected from the target resonator. In one example in which all of the energy stored in the source resonator 401 is discharged, when the reflected energy is stored in the source resonator 401, the demodulator 420 determines that the mutual resonance occurs. In another example in which energy that is reflected from the target resonator to the source resonator 401 is equal to or greater than a predetermined value, the demodulator 420 determines that the mutual resonance occurs.

The demodulator 420 demodulates data received from the energy receiving apparatus based on whether the mutual resonance occurs. For example, the demodulator 420 may interpret occurrence of the mutual resonance to be a bit '1' and may interpret nonoccurrence of the mutual resonance to be a bit '0.'

The demodulator 420 includes a dynamic range controller 421. The dynamic range controller 421 controls a dynamic range of an analog-to-digital converter (ADC) based on a distance between the energy receiving apparatus and the energy transmitting apparatus. The ADC is configured to sample a waveform of the energy stored in the source resonator 401. In one example in which the energy receiving apparatus is distant from the energy transmitting apparatus, a small amount of energy is stored in the source resonator 401 due to reflection of the energy. In this example, the dynamic range controller 421 sets the dynamic range of the ADC to be narrow.

The demodulator 420 also includes an amplifier 423. The amplifier 423 amplifies the amount of the energy reflected from the target resonator to an amount of energy that is great enough to be demodulated. In one example, the amplifier 423 may amplify, through sampling, the amount of the reflected energy to an amount of energy that is great enough to be demodulated. In another example, the amplifier 423 may automatically amplify the amount of the reflected energy using an automatic gain controller (AGC).

The measurement unit 430 measures a value of a voltage applied to the source resonator 401. The value of the voltage measured by the measurement unit 430 is used to determine whether the energy stored in the source resonator 401 is discharged.

The determination unit 440 determines whether the energy stored in the source resonator 401 is discharged based on the value of the voltage measured by the measurement unit 430. For example, when the value of the measured voltage is equal to or less than a predetermined voltage value, the determination unit 440 determines that the stored energy is discharged.

FIG. 5 is a block diagram illustrating an example of a data transmission apparatus. Referring to FIG. 5, the data transmission apparatus includes an energy receiver 510, a controller 520, and a modulator 530.

The energy receiver 510 receives energy through a mutual resonance between a target resonator 501 and a source resonator (not shown in FIG. 5, but shown in FIG. 4). Energy received by the target resonator 501 is reflected to the source resonator through the mutual resonance. When the mutual resonance is terminated, the energy received by the target resonator 501 remains in the target resonator 501 instead of being reflected to the source resonator.

The controller 520 determines whether to enable the mutual resonance to occur between the target resonator 501 and the source resonator, and controls an amount of energy reflected from the target resonator 501. For example, the controller 520 may determine whether to enable the mutual resonance to occur, and may change a resonant frequency of the target resonator 501 in accordance with the determination.

To determine whether energy stored in the source resonator is discharged, the controller 520 may determine whether the mutual resonance continuously occurs. For example, when the energy stored in the source resonator is being discharged, the energy transmitting apparatus connects a capacitor to the source resonator to change a resonant frequency of the source resonator and terminate the mutual resonance. Accordingly, when the mutual resonance between the target resonator 501 and the source resonator is terminated for a predetermined period of time, the controller 520 determines that the energy stored in the source resonator is being discharged.

Additionally, the controller 520 may determine a time agreed on in advance with the energy transmitting apparatus to be a time at which the energy stored in the source resonator is discharged.

The modulator 530 modulates data based on the amount of the energy reflected from the target resonator 501 after the energy stored in the source resonator is discharged.

When a large amount of energy is reflected from the target resonator 501, that is, when the mutual resonance occurs, the modulator 530 may modulate data to be a bit '1.' When energy is not reflected from the target resonator 501, or when the amount of the reflected energy is less than a predetermined amount, that is, when the mutual resonance does not occur, the modulator 530 may modulate data to be a bit '0.'

The controller 520 performs an overall control of the data transmission apparatus of FIG. 5, and may perform some or all of the functions of the energy receiver 510 and the modulator 530. The energy receiver 510, the controller 520, and the modulator 530 are separately illustrated in FIG. 5 to separately describe each function. However, when implementing an actual product, the controller 520 may perform all of the functions of the energy receiver 510 and the modulator 530, or may perform some of the functions of the energy receiver 510 and the modulator 530.

Figure 6:
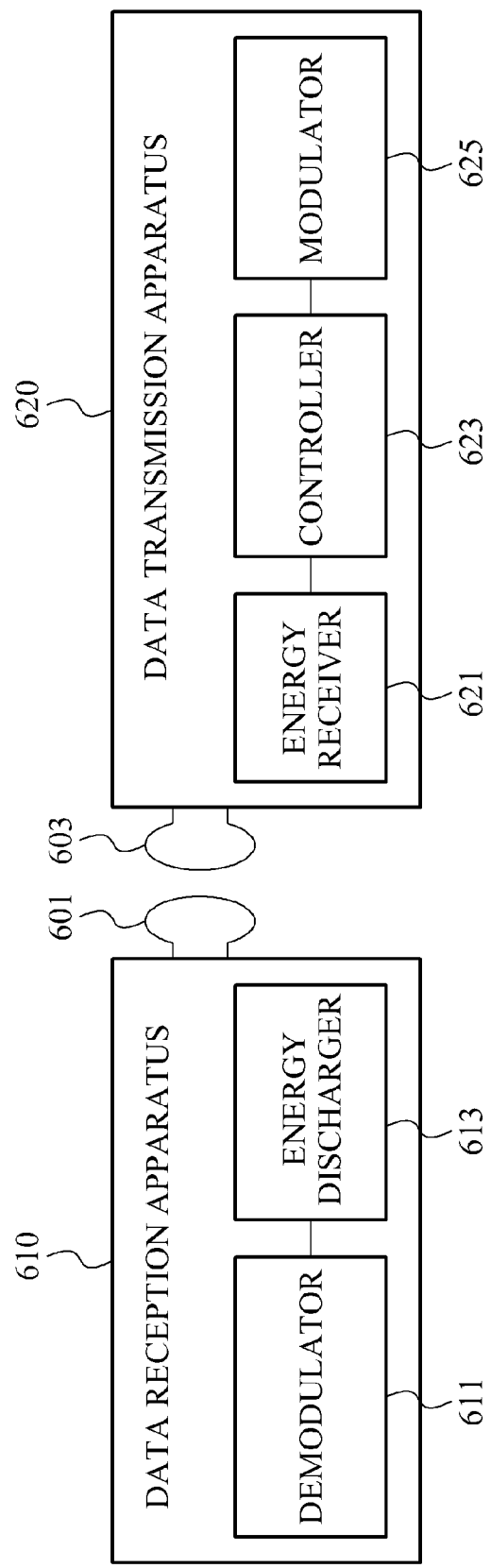
FIG. 6 is a block diagram illustrating an example of a data communication system.

FIG. 6 is a block diagram illustrating an example of a data communication system. In FIG. 6, the data communication system includes a data reception apparatus 610 and a data transmission apparatus 620.

The data reception apparatus 610, prior to receiving data from an energy receiving apparatus, discharges energy stored in a source resonator 601 during a mutual resonance between the source resonator 601 and a target resonator 603. Additionally, the data reception apparatus 610 demodulates data received from the energy receiving apparatus based on an amount of energy reflected from the target resonator 603 after the stored energy is discharged.

The data reception apparatus 610 may be included in an energy transmitting apparatus, and the data transmission apparatus 620 may be included in the energy receiving apparatus.

The data transmission apparatus 620 receives energy through the mutual resonance between the source resonator 601 and the target resonator 603, and modulates data based on the amount of the energy reflected from the target resonator 603 after the energy stored in the source resonator 601 is discharged.

The data reception apparatus 610 includes a demodulator 611 and an energy discharger 613.

The demodulator 611 demodulates data received from the energy receiving apparatus based on the amount of the energy reflected from the target resonator 603. The demodulator 611 determines whether the mutual resonance occurs between the source resonator 601 and the target resonator 603 based on the amount of the energy reflected from the target resonator 603.

The demodulator 611 demodulates the data received from the energy receiving apparatus based on whether the mutual resonance occurs. For example, the demodulator 611 may interpret occurrence of the mutual resonance to be a bit '1,' and may interpret nonoccurrence of the mutual resonance to be a bit '0.'

The energy discharger 613 may discharge the energy stored in the source resonator 601 through a resistor connected to the source resonator 601 before data is received from the energy receiving apparatus.

The data transmission apparatus 620 includes an energy receiver 621, a controller 623, and a modulator 625.

The energy receiver 621 receives energy through the mutual resonance between the source resonator 601 and the target resonator 603.

The controller 623 determines whether to enable the mutual resonance to occur between the source resonator 601 and the target resonator 603, and controls the amount of the energy reflected from the target resonator 603.

The modulator 625 modulates data based on the amount of the energy reflected from the target resonator 603 as controlled by the controller 623 after the energy stored in the source resonator 601 is discharged.

Figure 7:
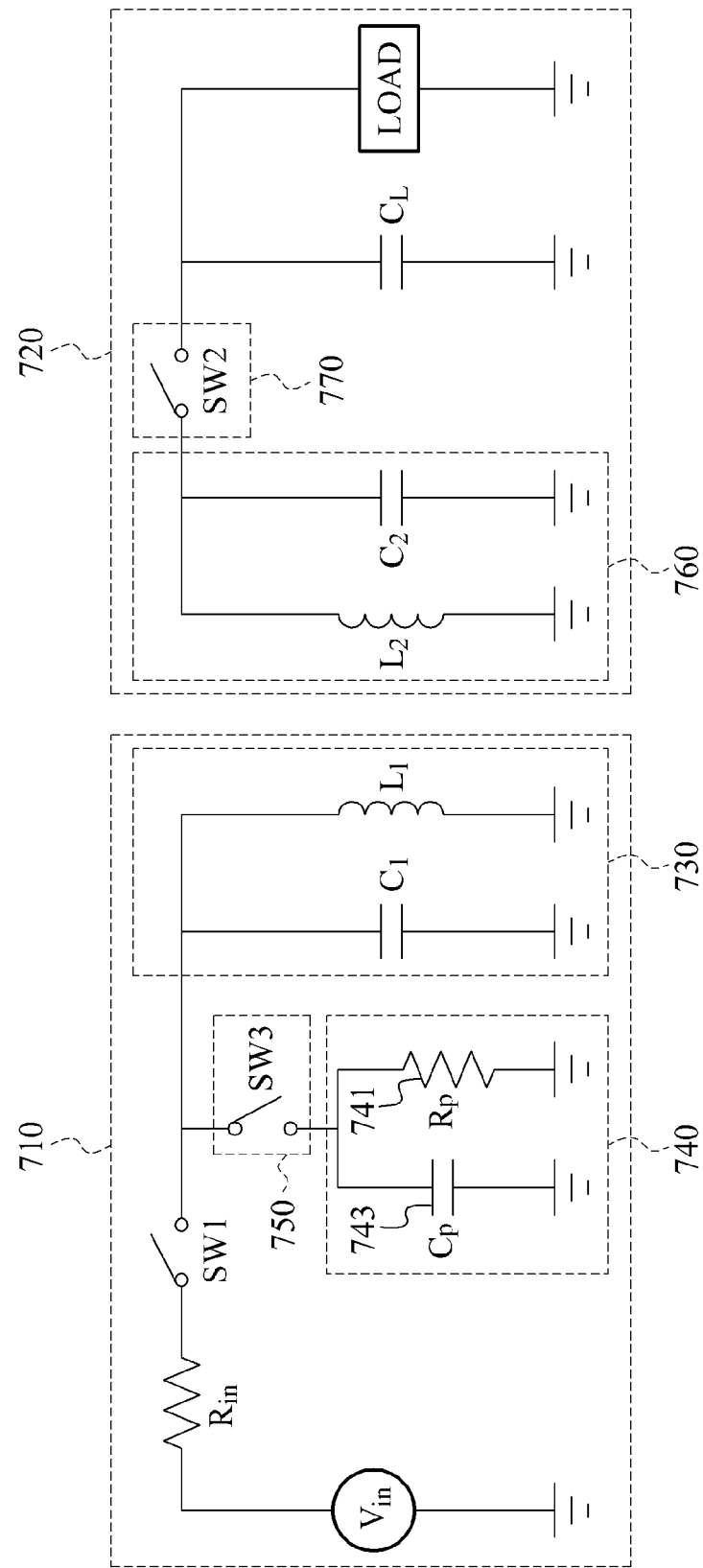
FIG. 7 is a diagram illustrating an example of an equivalent circuit of a data communication system.

FIG. 7 is a diagram illustrating an example of an equivalent circuit of a data communication system. Referring to FIG. 7, the data communication system includes a data reception apparatus 710 and a data transmission apparatus 720.

The data reception apparatus 710 functions as an apparatus for receiving data and transmitting energy at the same time. For example, when a switch SW1 is turned on, energy supplied from a power source $V_{in}$ is stored in a capacitor $C_1$ and an inductor $L_1$. The capacitor $C_1$ and an inductor $L_1$ are included in a source resonator 730. In other words, the energy supplied from the power source $V_{in}$ is stored in the source resonator 730. At this time, a switch SW3 750 is turned off.

When the data transmission apparatus 720 is located at a distance enabling mutual resonance with the data reception apparatus 710, the energy stored in the source resonator 730 is transferred to a target resonator 760 through a mutual resonance between the source resonator 730 and the target resonator 760. The target resonator 760 includes a capacitor $C_2$ and an inductor $L_2$. During occurrence of the mutual resonance, a switch SW2 770 is turned off. When the switch SW2 770 is turned on, a capacitor $C_L$ is connected to the target resonator 760, thereby changing a resonant frequency of the target resonator 760, and energy stored in the target resonator 760 is transferred to a load.

The data transmission apparatus 720 determines whether to enable the mutual resonance to occur between the target resonator 760 and the source resonator 730, and turns the switch SW2 770 on or off depending on a result of the determination. Mutual resonance between the target resonator 760 and the source resonator 730 occurs when the switch SW2 770 is turned off, and does not occur when the switch SW2 770 is turned on. Additionally, the data transmission apparatus 720 modulates data depending on whether the mutual resonance occurs. For example, when the mutual resonance occurs, the energy stored in the target resonator 760 is reflected to the source resonator 730, and the data transmission apparatus 720 modulates data based on an amount of the reflected energy.

To accurately measure an amount of energy reflected from the target resonator 760, the data reception apparatus 710 needs to discharge the energy stored in the source resonator 730 before the energy is reflected. The data reception apparatus 710 connects an energy discharger 740 to the source resonator 730 by turning the switch SW3 750 on so that the energy stored in the source resonator 730 is discharged by the energy discharger 740.

A resistor $R_p$ 741 is connected to the source resonator 730 when the switch SW3 750 is turned on, and dissipates the energy stored in the source resonator 730 as heat. A capacitor $C_p$ 743 is connected to the source resonator 730 when the switch SW3 750 is turned on, and changes a resonant frequency of the source resonator 730. When the capacitor $C_p$ 743 is connected to the source resonator 730, the mutual resonance between the source resonator 730 and the target resonator 760 is interrupted.

After the energy stored in the source resonator 730 is discharged by the energy discharger 740, the data reception apparatus 710 demodulates data based on amount of energy reflected from the data transmission apparatus 720.

When the data reception apparatus 710 and the data transmission apparatus 720 are distant from each other, the data reception apparatus 710 discharges energy remaining in the source resonator 730 before uplink data is received from the data transmission apparatus 720 in order to increase accuracy of reception of the uplink data.

Figure 8:
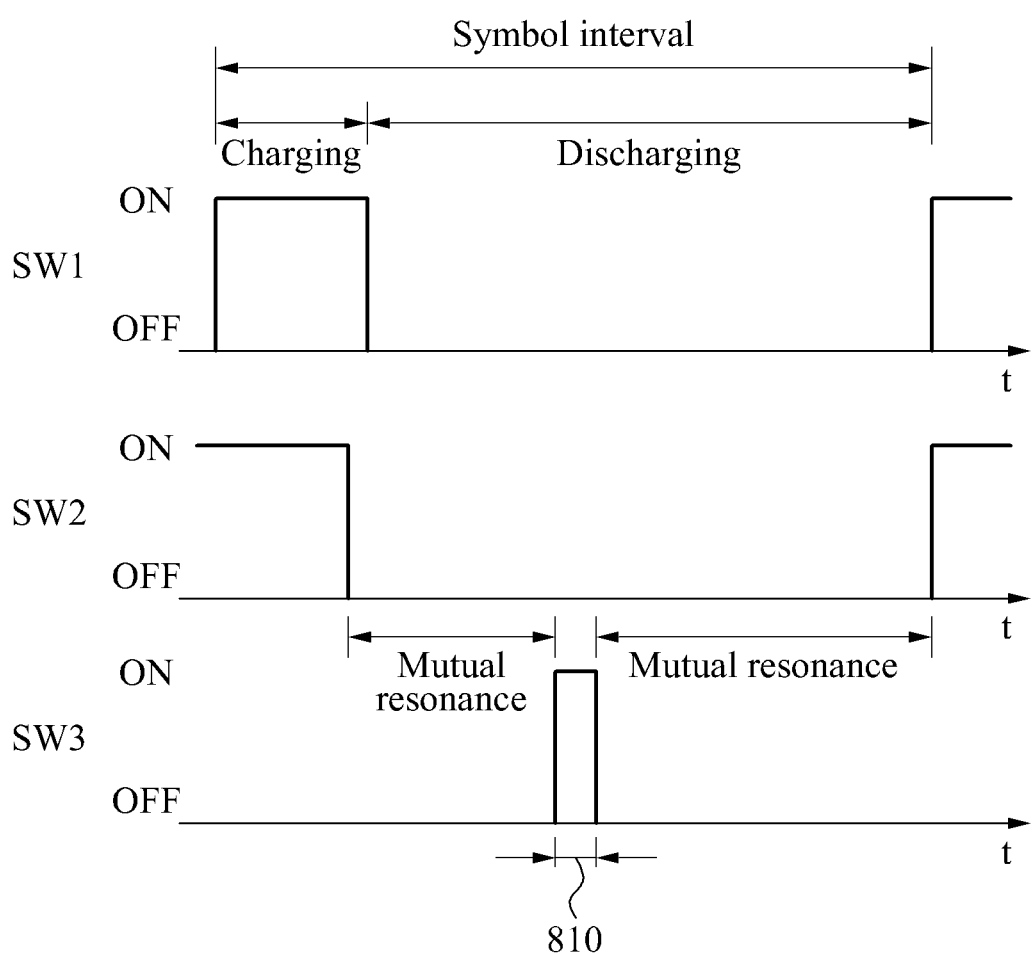
FIG. 8 is a diagram illustrating examples of operations of switches in the data communication system of FIG. 7.

FIG. 8 is a diagram illustrating examples of operations of the switches SW1, SW2 770, and SW3 750 in the data communication system of FIG. 7. For example, FIG. 8 illustrates an operation timing diagram of each of the switches SW1, SW2 770, and SW3 750 within one symbol interval in the equivalent circuit of FIG. 7.

In one symbol interval, the switch SW1 performs charging and discharging. When the switch SW1 performs discharging while the switch SW2 770 is turned off, energy is transferred to the target resonator 760 through the mutual resonance between the source resonator 730 and the target resonator 760.

When both the switches SW1 and SW2 770 are turned off and the switch SW3 750 is turned on, the energy stored in the source resonator 730 is discharged through the resistor $R_p$ 741 during an interval 810. Additionally, a resonant frequency of the source resonator 730 becomes different from a resonant frequency of the target resonator 760 because the capacitor $C_p$ 743 is connected to the source resonator 730 through the switch SW3 750, and energy stored in the target resonator 760 is prevented from being transferred to the source resonator 730.

When discharging of the energy stored in the source resonator 730 is completed and the switch SW3 750 is turn off after the interval 810, the mutual resonance between the source resonator 730 and the target resonator 760 occurs again, and the energy in the target resonator 760 is retransmitted to the source resonator 730. A phenomenon in which the energy in the target resonator 760 is retransmitted to the source resonator 730 is defined as 'energy reflection.'

Figure 9:
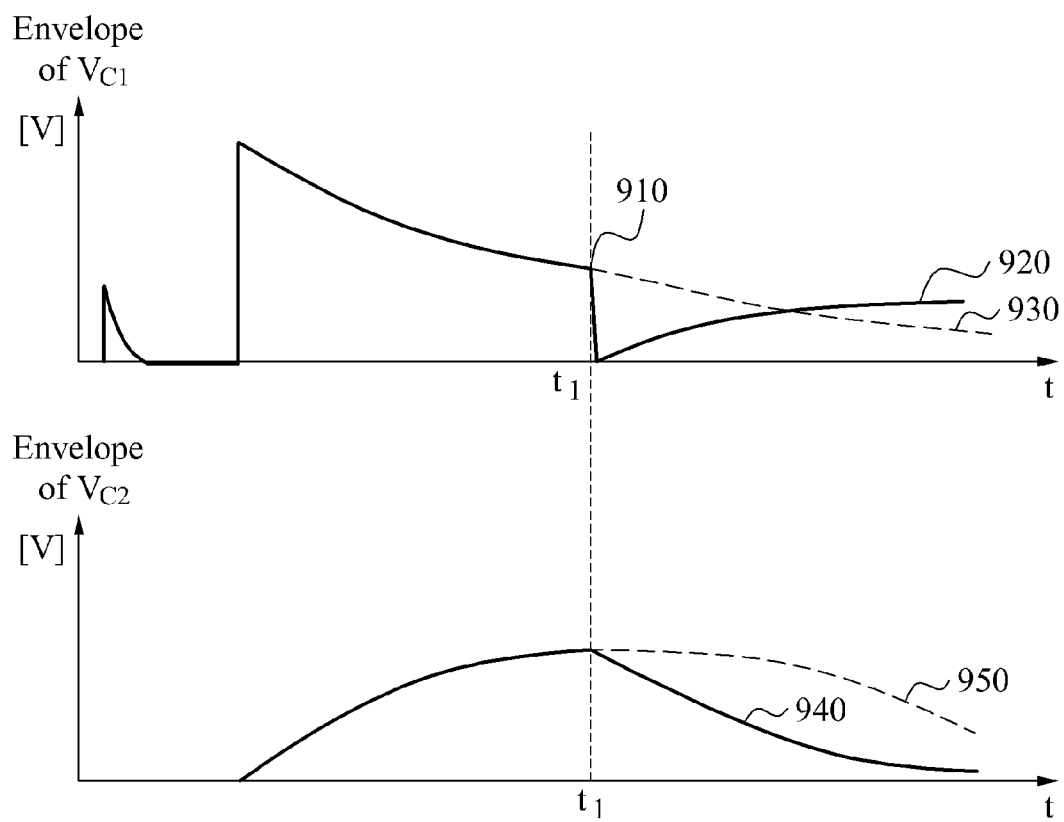
FIG. 9 is a graph illustrating an example of a voltage applied to a source resonator and an example of a voltage applied to a target resonator in the data communication system of FIG. 7.

FIG. 9 is a graph illustrating an example of a voltage applied to the source resonator 730 and an example of a voltage applied to the target resonator 760 in the data communication system of FIG. 7. Graphs of FIG. 9 show an envelope of a voltage $V_{C1}$ applied to the capacitor $C_1$ of the source resonator 730, and an envelope of a voltage $V_{C2}$ applied to the capacitor $C_2$ of the target resonator 760.

Referring to FIG. 9, at a time $t_1$ 910, discharging of the energy stored in the source resonator 730 through the resistor $R_p$ 741 is started. A solid line 920 represents an envelope of the voltage $V_{C1}$ applied to the capacitor $C_1$ when the energy is reflected from the target resonator 760 after the energy stored in the source resonator 730 is discharged. A dashed line 930 represents an envelope of the voltage $V_{C1}$ applied to the capacitor $C_1$ when the mutual resonance continuously occurs, rather than when the discharging is performed.

A solid line 940 represents an envelope of the voltage $V_{C2}$ applied to the capacitor $C_2$ when the energy is reflected from the target resonator 760 after the energy stored in the source resonator 730 is discharged, and a dashed line 950 represents an envelope of the voltage $V_{C2}$ applied to the capacitor $C_2$ when the mutual resonance continuously occurs, rather than when the discharging is performed.

The data reception apparatus 710 of FIG. 7 determines whether data is received by comparing waveforms of the envelopes of the voltages $V_{C1}$ and $V_{C2}$, and demodulates the received data based on a result of the determination.

Figure 10:
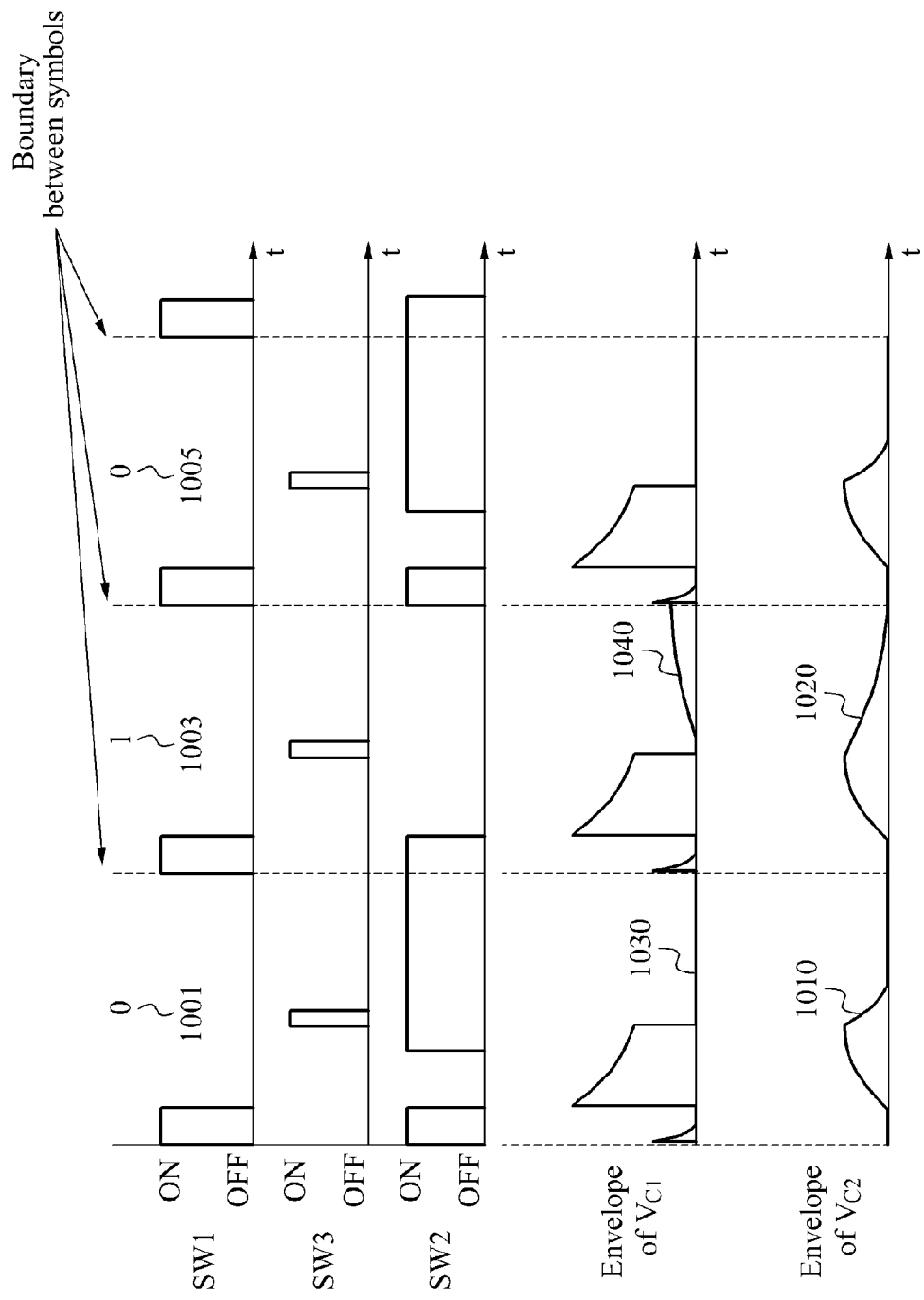
FIG. 10 is a graph illustrating an example of an operation timing of switches in an example in which a predetermined bit is transmitted, and illustrating an example of a waveform of a voltage applied to a source resonator and an example of a waveform of a voltage applied to a target resonator in the data communication system of FIG. 7.

FIG. 10 is a graph illustrating an example of an operation timing of switches in an example in which a predetermined bit is transmitted, and illustrates an example of a waveform of a voltage applied to the source resonator 730 and an example of a waveform of a voltage applied to the target resonator 760 in the data communication system of FIG. 7.

Graphs of FIG. 10 show an operation timing of the switches SW1, SW2 770, and SW3 750 in examples in which the data transmission apparatus 720 of FIG. 7 transmits data '0' and '1', and show a waveform of a voltage $V_{C1}$ applied to the capacitor $C_1$ of the source resonator 730 and a waveform of a voltage $V_{C2}$ applied to the capacitor $C_2$ of the target resonator 760 in the data communication system of FIG. 7.

When the target resonator 760 receives energy through the mutual resonance with the source resonator 730, and then transfers the received energy to a load located after the target resonator 760, or charges a battery with the received energy, instead of reflecting the received energy to the source resonator 730, reflected energy is not induced to the source resonator 730. The data transmission apparatus 720 may transmit data based on whether reflected energy is induced in the source resonator 730.

The data transmission apparatus 720 and the data reception apparatus 710 may determine that data '0' corresponds to a case in which reflected energy is not induced in the source resonator 730, and data '1' corresponds to a case in which energy is induced in the source resonator.

To transmit data '0' 1001 and 1005, reflection of energy from the target resonator 760 is to be prevented, and accordingly the switch SW3 750 is turned on during an interval in which the switch SW2 770 is turned on. When the switch SW3 750 is turned on, the energy stored in the source resonator 730 is discharged by the resistor $R_p$ 741.

To prevent the mutual resonance from occurring when both the switches SW2 770 and SW3 750 are turned on, a value of the capacitor $C_p$ 743 and a value of the capacitor $C_L$ must be different from each other.

To transmit data '1' 1003, reflection of energy from the target resonator 760 is not to be prevented. Accordingly, the switches SW1 and SW2 770 are turned off so that the mutual resonance may continuously occur.

In an envelope 1030 of the voltage $V_{C1}$ applied to the capacitor $C_1$ of the source resonator 730 in the data reception apparatus 710 in an example in which the data '0' 1001 is received, a value of the voltage $V_{C1}$ is substantially '0.' In contrast, in an envelope 1040 of the voltage $V_{C1}$ applied to the capacitor $C_1$ in an example in which the data '1' 1003 is received, a value of the voltage $V_{C1}$ is not close to '0,' but has a value that represents an amount of reflected energy reflected from the target resonator 760.

In an envelope 1010 of the voltage $V_{C2}$ applied to the capacitor $C_2$ of the target resonator 760 in the data transmission apparatus 720 in an example in which the data '0' 1001 is transmitted, energy is transferred to a load or a battery through the turned-on switch SW2 770, and the energy stored in the target resonator 760 is quickly consumed, so a value of the voltage $V_{C2}$ quickly declines. In contrast, in an envelope 1020 of the voltage $V_{C2}$ applied to the capacitor $C_2$ in an example in which the data '1' 1003 is transmitted, a value of the voltage $V_{C2}$ represents an amount of energy obtained by excluding the reflected energy reflected from the target resonator 760 from the energy stored in the target resonator 760.

Figure 11:
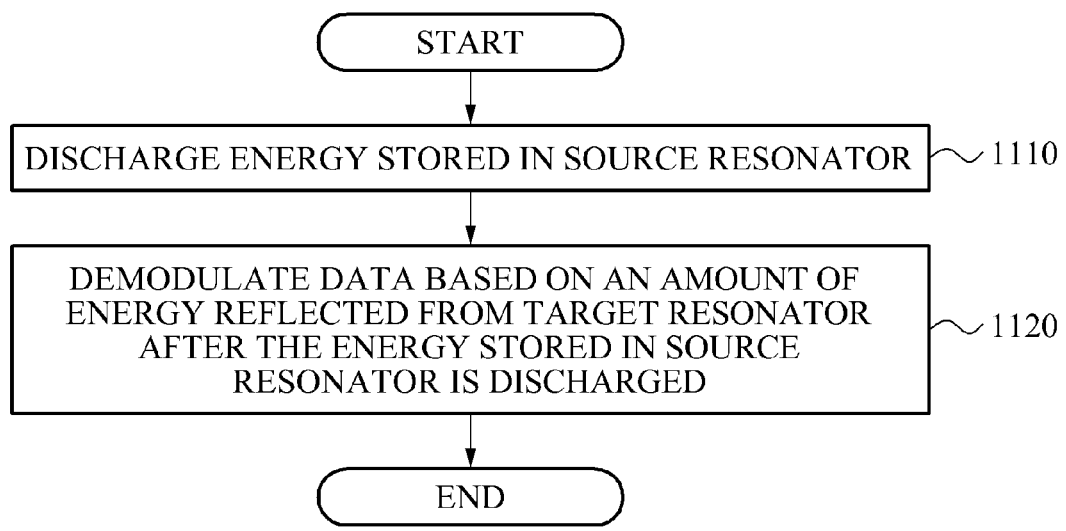
FIG. 11 is a flowchart illustrating an example of a data reception method.

FIG. 11 is a flowchart illustrating an example of a data reception method. Referring to FIG. 11, in 1110, a data reception apparatus discharges energy stored in a source resonator. The data reception apparatus may discharge the energy stored in the source resonator, prior to receiving data from an energy receiving apparatus, during a mutual resonance between the source resonator and a target resonator of a data transmission apparatus.

In 1120, the data reception apparatus demodulates data based on an amount of energy reflected from the target resonator after the energy stored in the source resonator is discharged.

As described above, according to various examples, a data reception apparatus may electrically connect a resistor to a source resonator using a switch, and may consume energy stored in the source resonator using the resistor.

Additionally, according to various examples, a data reception apparatus may determine whether a mutual resonance between a source resonator and a target resonator occurs based on an amount of energy reflected from the target resonator, and may demodulate data received from an energy receiving apparatus based on whether the mutual resonance occurs.

Furthermore, according to various examples, a data reception apparatus may connect a capacitor to a source resonator to change a resonant frequency of the source resonator and interrupt mutual resonance between the source resonator and a target resonator while energy stored in the source resonator is discharged through a resistor.

Moreover, according to various examples, in a system configured to transmit both energy and data using mutual resonance, a data reception apparatus may accurately demodulate data received from a data transmission apparatus by discharging energy stored in a source resonator prior to demodulating the data.

In addition, according to various examples, a data reception apparatus may discharge energy stored in a source resonator prior to reflection of energy from a data transmission apparatus to increase a transmission distance of uplink data.

Additionally, according to various examples, a data reception apparatus may discharge energy stored in a source resonator prior to reflection of energy from a data transmission apparatus, and accordingly the data transmission apparatus may increase a distance enabling data transmission without a supply of power other than power received via mutual resonance.

The switch units 130 and 160, the control units 220 and 250, the energy discharger 410, the switch 413, the demodulator 420, the dynamic range controller 421, the measurement unit 430, the determination unit 440, the energy receiver 510, the controller 520, the modulator 530, the data reception apparatus 610, the demodulator 611, the energy discharger 613, the data transmission apparatus 620, the energy receiver 621, the controller 623, the modulator 625, and the switches SW1, SW2 750, and SW3 770 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data reception apparatus comprising:
   an energy discharger configured to discharge, prior to the data reception apparatus receiving data from an energy receiving apparatus, energy stored in a source resonator during a mutual resonance between the source resonator and a target resonator; and
   a demodulator configured to demodulate data received from the energy receiving apparatus based on an amount of energy transmitted from the target resonator in response to the energy stored in the source resonator being discharged,
   wherein the source resonator receives energy from the target resonator based on a mutual resonance that is generated in response to the energy stored in the source resonator being discharged, and
   in response to a charge in the target resonator reaching a predetermined value, a switch is turned on to connect a capacitor to the target resonator and charge a resonant frequency of the target resonator, and in response to the charge in the target resonator being less than a predetermined value, the switch is turned off to make the resonant frequency of the target resonator identical to a resonant frequency of the source resonator.

2. The data reception apparatus of claim 1, wherein the energy discharger comprises:
   a resistor configured to consume the energy stored in the source resonator; and
   a switch configured to electrically connect the resistor to the source resonator.

3. The data reception apparatus of claim 2, wherein the energy discharger further comprises a capacitor configured to change a resonant frequency of the source resonator during discharging of the energy stored in the source resonator through the resistor.

4. The data reception apparatus of claim 1, wherein the demodulator is further configured to determine whether the mutual resonance occurs between the source resonator and the target resonator based on the amount of the transmitted energy, and demodulate the received data based on whether the mutual resonance occurs.

5. The data reception apparatus of claim 1, further comprising:
   a measurement unit configured to measure a value of a voltage applied to the source resonator; and
   a determination unit configured to determine whether the energy stored in the source resonator is discharged based on the value of the voltage measured by the measurement unit.

6. The data reception apparatus of claim 1, wherein the demodulator comprises a dynamic range controller configured to control a dynamic range of an analog-to-digital converter (ADC) based on a distance between the energy receiving apparatus and an energy transmitting apparatus, the ADC being configured to perform sampling of a waveform of the energy stored in the source resonator.

7. The data reception apparatus of claim 1, wherein the demodulator comprises an amplifier configured to amplify the amount of the energy transmitted from the target resonator to an amount of energy great enough to be demodulated.

8. The data reception apparatus of claim 1, wherein the demodulator demodulates the data based on the amount of the transmitted energy included in the source resonator in response to the energy stored in the source resonator being consumed.

9. A data transmission apparatus comprising:
   an energy receiver configured to receive energy through a mutual resonance between a target resonator and a source resonator;
   a switch unit that disconnects a first capacitor from the energy receiver during the mutual resonance and connect the first capacitor to the energy receiver in response to a termination of the mutual resonance; and
   a modulator configured to modulate data based on an amount of energy transmitted from the target resonator in response to energy stored in the source resonator being discharged,
   wherein the target resonator transmits energy to the source resonator based on a mutual resonance that is generated in response to the energy stored in the source resonator being discharged, and in response to the mutual resonance between the target resonator and the source resonator being terminated for a predetermined period of time, the energy stored in the source resonator is discharged, and while the energy in the source resonator is being discharged, a second capacitor is connected to the source resonator to charge a resonant frequency of the source resonator to terminate the mutual resonance.

10. The data transmission apparatus of claim 9, further comprising a controller configured to determine whether to enable the mutual resonance to occur between the target resonator and the source resonator, and control the amount of energy reflected from the target resonator.

11. The data transmission apparatus of claim 10, wherein the controller is further configured to change a resonant frequency of the target resonator.

12. The data transmission apparatus of claim 9, wherein the power input unit comprises an input voltage and an internal resistor and the power transmitting unit comprises a resistance and an inductance, and
a voltage applied to the capacitor has a value of 0 during a steady state of the source resonator.

13. A data communication system comprising:
a data reception apparatus configured to discharge, prior to receiving data from an energy receiving apparatus, energy stored in a source resonator during a mutual resonance between the source resonator and a target resonator, and demodulate data received from the energy receiving apparatus based on an amount of energy transmitted from the target resonator after the energy stored in the source resonator is discharged; and
a data transmission apparatus configured to receive energy through the mutual resonance, and modulate data based on the amount of energy reflected from the target resonator in response to the energy stored in the source resonator being discharged,
wherein the target resonator transmits energy to the source resonator based on a mutual resonance that is generated in response to the energy stored in the source resonator being discharged, and
in response to a charge in the target resonator reaching a predetermined value, a switch is turned on to connect a capacitor to the target resonator and change a resonant frequency of the target resonator, and in response to the charge in the target resonator being less than a predetermined value, the switch is turned off to make the resonant frequency of the target resonator identical to a resonant frequency of the source resonator.

14. The data communication system of claim 13, wherein the data reception apparatus comprises:
an energy discharger configured to discharge, prior to receiving the data from the energy receiving apparatus, the energy stored in the source resonator through a resistor connected to the source resonator; and
a demodulator configured to demodulate the data received from the energy receiving apparatus based on the amount of the energy transmitted from the target resonator.

15. The data communication system of claim 13, wherein the data transmission apparatus comprises:
a controller configured to determine whether to enable the mutual resonance to occur between the target resonator and the source resonator, and control the amount of energy reflected from the target resonator; and
a modulator configured to modulate data based on the amount of the energy reflected from the target resonator in response to the energy stored in the source resonator being discharged.

16. The data communication apparatus of claim 13, wherein the data reception apparatus turns on a second switch in response to energy stored in the target resonator having a peak value to change the resonant frequency of the target resonator to be different from the resonant frequency of the source resonator and to capture the energy stored in the target resonator.

17. A data reception method comprising:
discharging, prior to receiving data from an energy receiving apparatus, energy stored in a source resonator during a mutual resonance between the source resonator and a target resonator; and
demodulating data received from the energy receiving apparatus based on an amount of energy transmitted from the target resonator in response to the energy stored in the source resonator being discharged,
wherein the data reception method further comprises receiving energy from the target resonator based on a mutual resonance that is generated in response to the energy stored in the source resonator being discharged, and
in response to a charge in the target resonator reaching a predetermined value, a control unit turns on a switch to connect a capacitor to a charging unit and change a resonant frequency of the target resonator, and in response to the charge in the target resonator being less than a predetermined value, the control unit turns off the switch to make the resonant frequency of the target resonator identical to a resonant frequency of the source resonator.

18. The data reception method of claim 17, wherein the discharging comprises:
electrically connecting a resistor to the source resonator using a switch; and
consuming the energy stored in the source resonator using the resistor.

19. The data reception method of claim 18, wherein the discharging further comprises:
connecting a capacitor to the source resonator to change a resonant frequency of the source resonator during discharging of the energy stored in the source resonator through the resistor.

20. The data reception method of claim 17, wherein the demodulating comprises:
determining whether the mutual resonance occurs between the source resonator and the target resonator based on the amount of the transmitted energy; and
demodulating the received data based on whether the mutual resonance occurs.

* * * * *